United States Patent [19]

Stout

[11] 4,113,036
[45] Sep. 12, 1978

[54] LASER DRILLING METHOD AND SYSTEM OF FOSSIL FUEL RECOVERY

[76] Inventor: Daniel W. Stout, 110 Wettaw La., North Palm Beach, Fla. 33408

[21] Appl. No.: 675,582

[22] Filed: Apr. 9, 1976

[51] Int. Cl.² .......................................... E21B 7/14
[52] U.S. Cl. .................................. 175/11; 166/248; 175/45
[58] Field of Search .................. 175/16, 77, 11; 166/305 R, 308, 57, 248; 219/121 L, 121 LM; 299/11, 14

[56] References Cited

U.S. PATENT DOCUMENTS

| | | | |
|---|---|---|---|
| 3,301,337 | 1/1967 | Vaughn et al. | 175/77 |
| 3,493,060 | 2/1970 | Van Dyk | 175/16 |
| 3,652,447 | 3/1972 | Yant | 208/11 R |
| 3,693,716 | 9/1972 | Stout | 175/16 X |
| 3,696,866 | 10/1972 | Dryden | 166/248 |
| 3,871,485 | 3/1975 | Keenan, Jr. | 299/14 X |
| 3,977,478 | 8/1976 | Shuck | 175/16 |
| 4,019,331 | 4/1977 | Rom et al. | 299/11 |

Primary Examiner—Ernest R. Purser
Assistant Examiner—Richard E. Favreau
Attorney, Agent, or Firm—Clarence A. O'Brien; Harvey B. Jacobson

[57] ABSTRACT

Underground bores are drilled through a formation from a plurality of vertical bore holes by use of laser beams to form a subsurface, three-dimensional bore passage pattern for in situ preparation of fossil fuel deposits to be recovered. A laser beam is projected vertically through an angularly adjusted tubular housing inserted into each bore hole from which a reflected drilling beam is laterally directed by an angularly adjusted reflector to form a bore passage.

19 Claims, 11 Drawing Figures

LASER DRILLING METHOD AND SYSTEM OF FOSSIL FUEL RECOVERY

This invention relates to drilling of subterranean formations by use of laser beam energy in connection with in situ preparation and recovery of fossil fuel deposits in the form of gas, oil and other liquefied products.

The present invention is an improvement over the invention disclosed in my prior U.S. Pat. No. 3,693,718, wherein a plurality of laser beam generators are arranged in circumferentially spaced relation to each other surrounding a bore hole to project a high energy composite beam into the bore hole for drilling purposes. Improvements in laser beam generators now make it economically feasible to utilize such multiple arrays of laser beam generators or single continuous wave types of lasers for remote drilling purposes as well as in situ drilling. It is therefore an important object of the present invention to provide apparatus utilizing laser beam generators for either remote or in situ drilling of subsurface bores in three-dimensional matrix patterns to prepare fossil fuel deposits for recovery of gas, oil and other liquefied products including gasified and liquefied coal, lignite, sub-bituminous products, tar sands and oil from shale oil rock. Other materials such as aluminum deposits in oil shale may also be recovered after extraction of oil. An additional object is to provide means for drilling subsurface bores in many different patterns to enable the most efficient exploitation and extraction of underground fossil fuel deposits by in situ processing.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
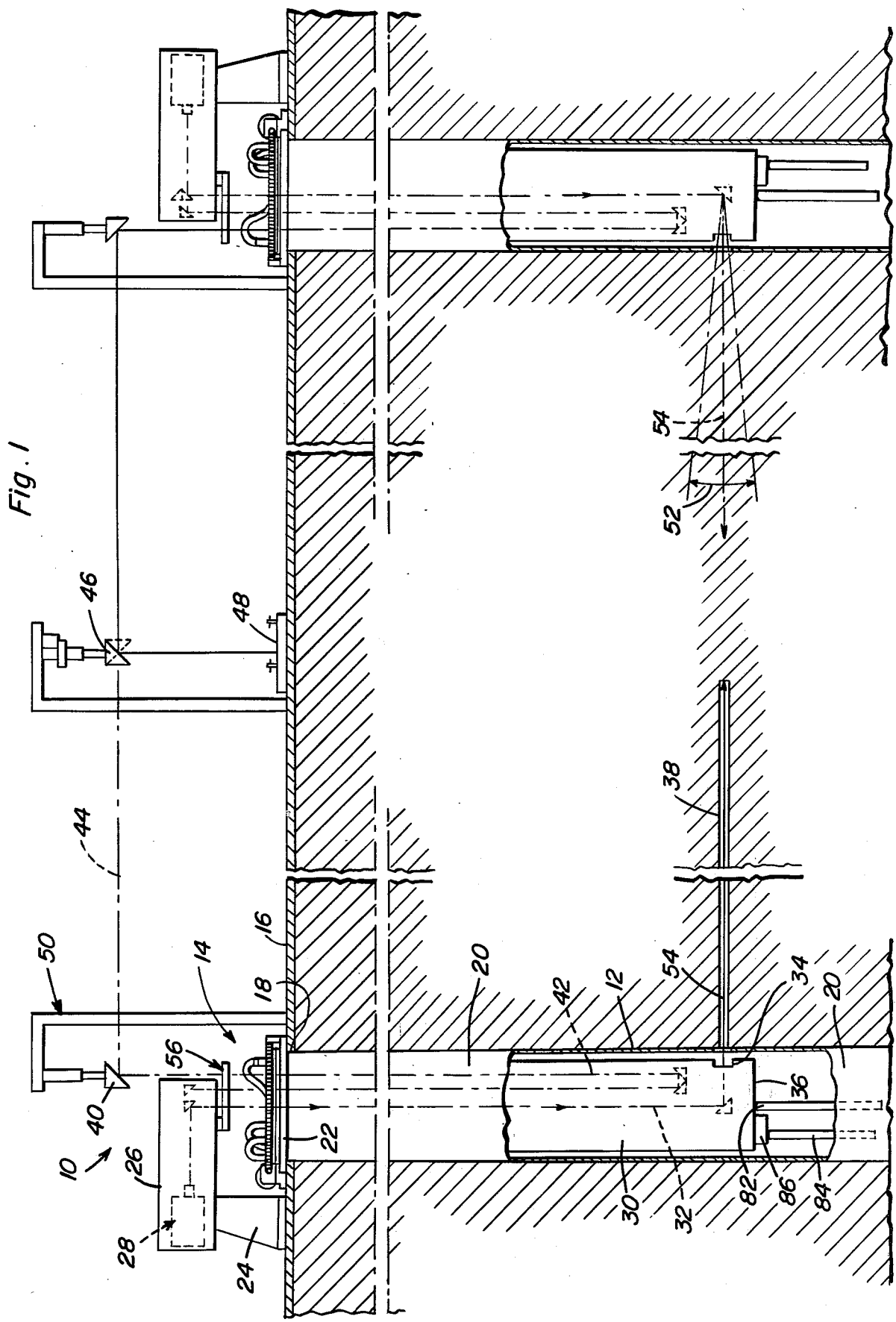
FIG. 1 is a simplified side sectional view of an underground formation being drilled for recovery of fossil fuel deposits with the apparatus of the present invention.

Referring now to the drawings in detail, FIG. 1 illustrates a typical installation of the present invention for preparation of fossil fuel deposits from a subsurface formation by equipment generally denoted by reference numeral 10 associated with a plurality of spaced, vertical bore holes 12 into which drilling assemblies 14 are inserted. The equipment 10 includes a surface supported base plate 16 having spaced openings 18 formed therein in alignment with the bore holes. Each drilling assembly 14 includes a tubular bore hole lining casing 20 suspended by an upper flange 22 from the base plate and extending downwardly to the bottom of the bore hole. Operatively positioned above each bore hole by means of a support bracket 24 fixed to the base plate is a horizontally elongated housing 26 enclosing a laser generator 28. A tubular housing 30 projects downwardly from each casing 20 into each bore hole to enclose an optical path for a laser beam 32 originating from the laser generator 28. The laser beam 32 which is directed through the housing 30 generally parallel to its longitudinal axis is reflected radially outwardly therefrom through an opening 34 located adjacent the lower end 36 of the housing to drill a horizontal bore 38 into the formation as shown. Thus, bores 38 are drilled and extend from each of the vertical bore holes 12 at one or more depths to form a three dimensional matrix of bores in the underground formation. Based on geological data previously obtained, the bores 38 may be drilled along paths matching the natural fractionation pattern. Toward that end, each housing 30 is vertically and angularly adjusted relative to its longitudinal axis in order to vary its orientation, location and alignment in a manner to be further explained hereinafter.

In order to visually monitor the alignment of the laser beams and the subterranean bores 38 to be drilled thereby, from an above-surface location, an optical alignment system is provided. This optical system includes a reflector prism 40 adjustably mounted on the base plate above each laser housing 26 to intercept a folded laser alignment beam 42 alternately projected through the vertical bore-hole housing 30 from the laser generator 28 along a path disposed in parallel spaced relation to the laser drilling beam 32. Reflected laser alignment beams 44 extending horizontally from each of the reflectors 40 are reflected vertically downwardly by a centrally located reflector 46 onto the upper surface of a target disc 48 centrally mounted on the base plate 16 as shown in FIG. 1. Suitable supports 50 operatively position the reflectors 40 and 46.

In addition to varying the vertical depth of the bores 38 and their angular positions relative to the longitudinal axis of associated bore holes 12, the vertical angle of each bore 38 may be varied within a predetermined angular range as denoted by reference numeral 52 in FIG. 1. An above-surface system is provided to monitor and record the adjusted angular orientation of the drilling beams 54 as will be explained hereinafter. This system will also record the depth of the drilling beam 54 by means of an optical depth finder 56 through which the alignment beam 42 may pass. It will therefore become apparent that the apparatus 12 of the present invention may be adjusted to effect drilling pursuant to many different underground bore patterns deemed desirable for different in situ processing and recovery requirements including natural fractionation patterns as aforementioned. Further, the drilling patterns may be monitored and recorded.

Figure 2:
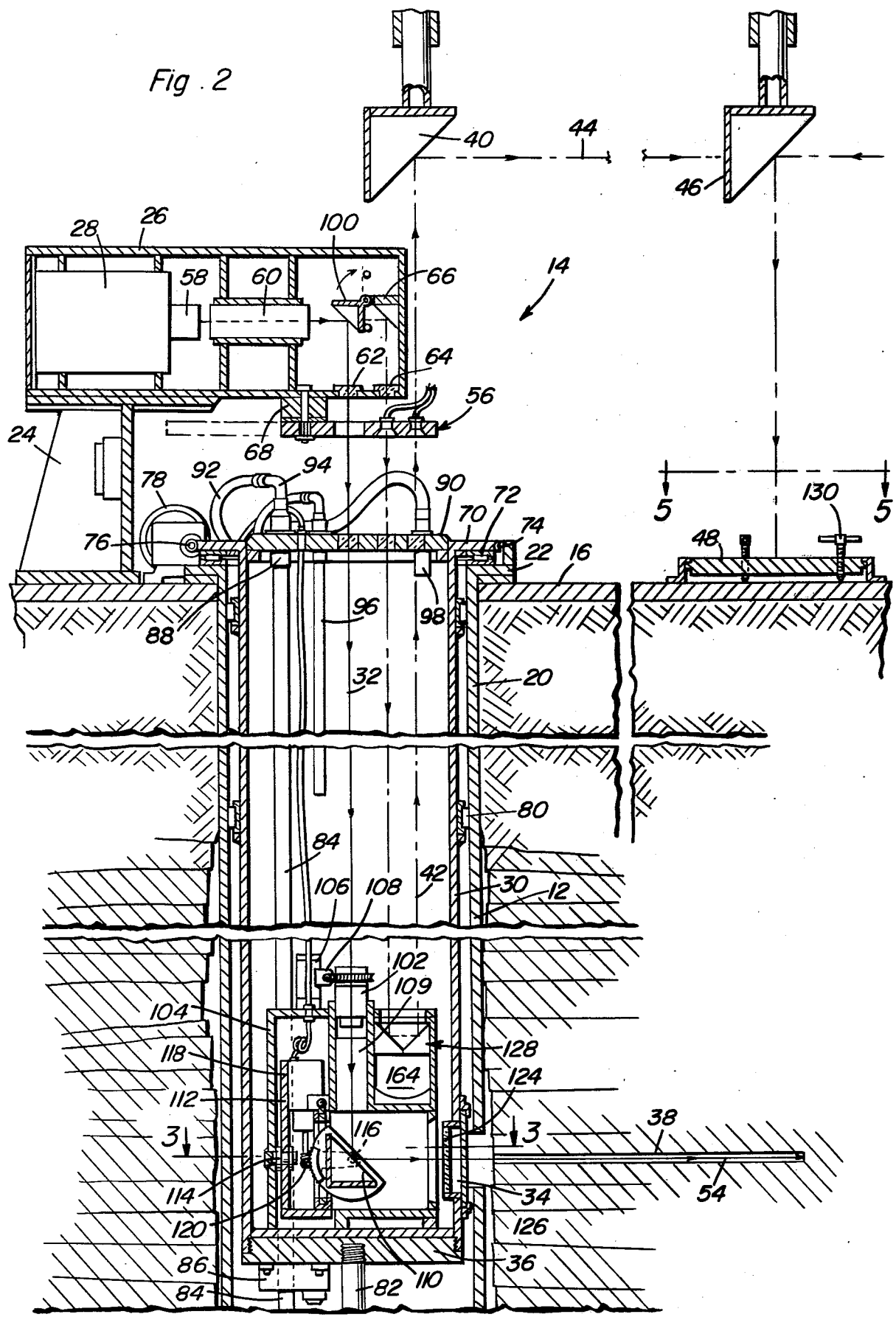
FIG. 2 is an enlarged side sectional view of a portion of the apparatus shown in FIG. 1.

As shown in FIG. 2, a laser beam is projected from the laser generator 28 through a focusing lens 58 and a collimation lens 60. A continuous wave type laser generator presently known may be utilized for a required amount of photon energy. The laser beam reflected downwardly from the housing 26 either through flat optical plate 62 or 64 along path of beam 32 substantially aligned with the longitudinal axis of housing 30 or along the folded optical path of the alignment beam 42. Accordingly, a reflector 66 is fixedly mounted within the housing 26 to initially reflect the laser beam downwardly through plate 64 to form the alignment beam. The depth finder 56 is pivotally mounted by the pivot assembly 68 and may be swung into and out of position for intercepting the alignment beam as shown by solid and dotted line in FIG. 2.

The tubular housing 30 as shown in FIG. 2 has an upper flange 70 axially spaced from the flange 22 of the casing 20 by a bearing 72 rotationally supporting the load of the housing 30. The radially outer rim of the flange 70 is provided with helical gear teeth 74 to form a worm wheel in mesh with a worm gear 76 driven by an adjusting motor 78. The worm gearing thus forms a self-locking high reduction drive for effecting angular adjustment of the tubular housing 30 relative to the fixed casing 20. Axially spaced guide bearings 80 maintain concentricity between the casing and the housing during angular adjustment.

The lower end 36 of the housing is closed by an end wall to which a solid rod 82 is secured in order to abut the bottom of the bore hole and prevent damage to a suction conduit 84 extending downwardly from a vacuum pump 86 mounted on the end wall 36. The suction conduit thus maintains a suction pressure in the bore hole and conducts fluids therefrom to the surface. The conduit 84 therefore extends through a fitting 88 in a top cover 90 secured to and closing the upper end of the housing 30. A discharge hose 92 is connected by elbow 94 to the suction conduit. The interior of the housing is maintained cool by injection of a cooling gas through inlet pipe 96 extending downwardly from the cover 70. A gas return outlet 98 is also mounted on the cover for removal of heated gas rising to the top of the housing. Suitable means are provided for supplying and effecting circulation of the cooling gas through the gas inlet and outlet.

Figure 3:
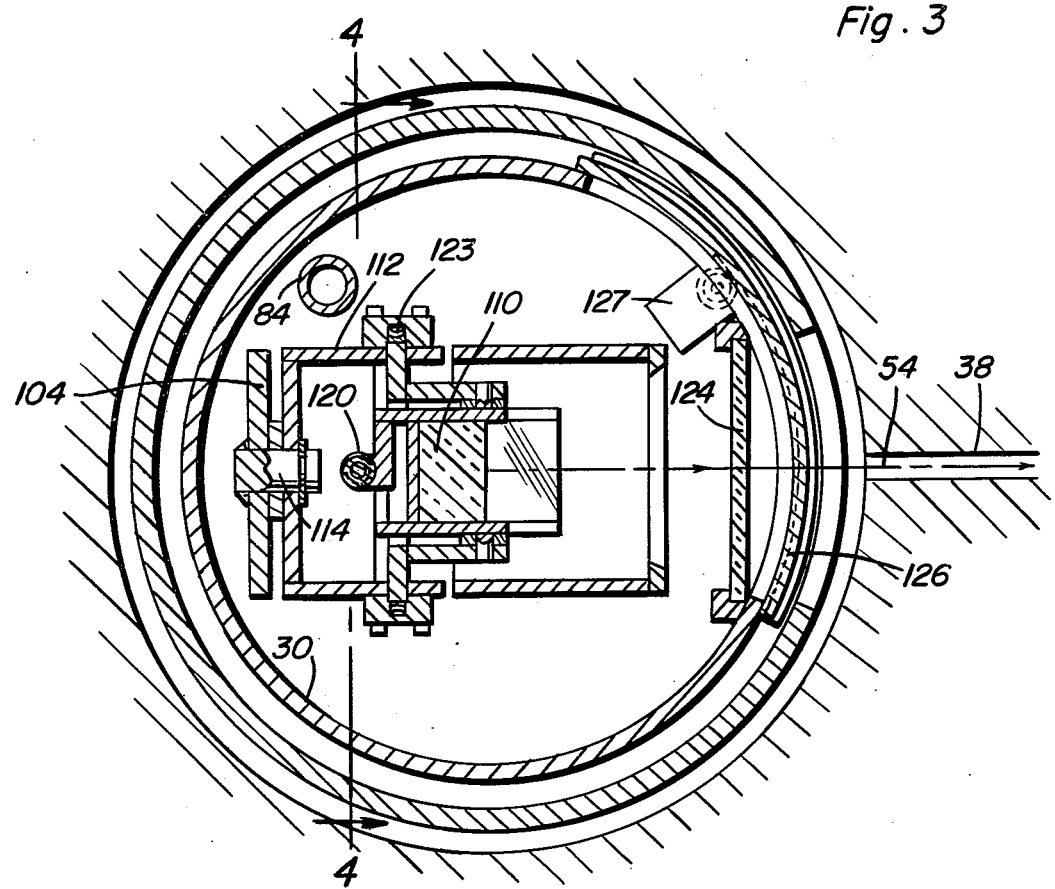
FIG. 3 is an enlarged transverse section view taken substantially through a plane indicated by section line 3—3 in FIG. 2.
Figure 4:
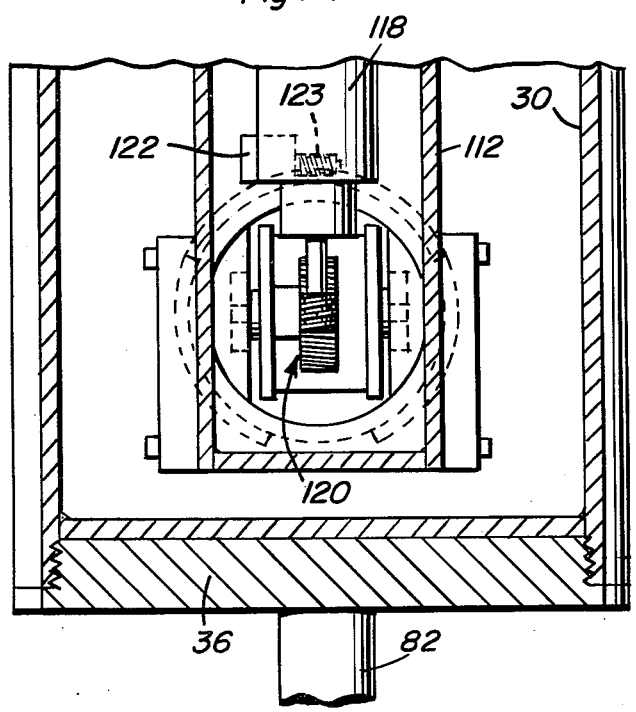
FIG. 4 is a partial section view taken substantially through a plane indicated by section line 4—4 in FIG. 3.

Pivotally connected to the fixed reflector 66 in the laser housing 26 is a second reflector 100. When displaced to the position shown in FIG. 2, the reflector 100 intercepts the laser beam and reflects it downwardly along the path 32 aligned with a focusing lens 102 that projects upwardly from casing 104 fixed to the bottom of housing 30. Focusing of the lens 102 is effected through a focusing motor 106 drivingly connected by worm gearing 108 to the cylindrical housing of the lens. The focused laser beam passes through a collimation lens 109 and is intercepted by an adjustable reflector 110 pivotally carried by a support bracket 112 which is in turn pivotally mounted by pivot 114 in the casing 104. The reflector 110 is displaced to an adjusted position about pivot axis 116 intersected by the axis of beam 32 by an adjusting motor 118 through sector worm gearing 120. The reflector 110 is also angularly adjusted about the axis of the drilling beam 54 by motor 122 through a worm gearing 123 connected to the reflector as more clearly seen in FIGS. 3 and 4. The reflector adjusting mechanism is protectively enclosed within casing 104 by a flat optical plate 124 from which the drilling beam emerges. The outlet opening 34 is aligned with the plate 124 and is adapted to be sealed by an arcuate seal plate 126 to protect the interior of the housing 30. A motor 127 as shown in FIG. 3, is operative to open and close the opening 34 by displacement of the seal plate between open and closed positions.

Figure 5:
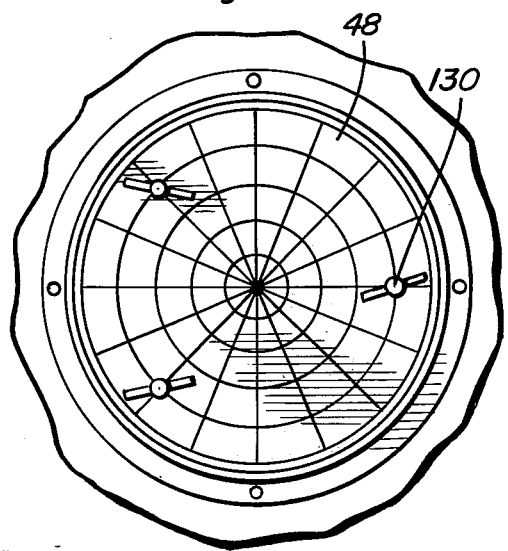
FIG. 5 is an enlarged top plan view of the target disc as seen from section line 5—5 in FIG. 2.

Also mounted by the casing 104 above the transmissive plate 124 is a beam folding reflector assembly 128. Thus the alignment beam 42 is directed to the above-surface reflector 40 when the pivotal reflector 100 is in its inoperative position. The alignment beam will therefore produce a visual indication on the target disc 48 as shown in FIG. 5 reflecting the angular orientation of the housing 30 and the drilling beam 54 emerging therefrom relative to a center point between the bore holes 14. The target disc may be leveled on the base plate by leveling screws 130.

Figure 10:
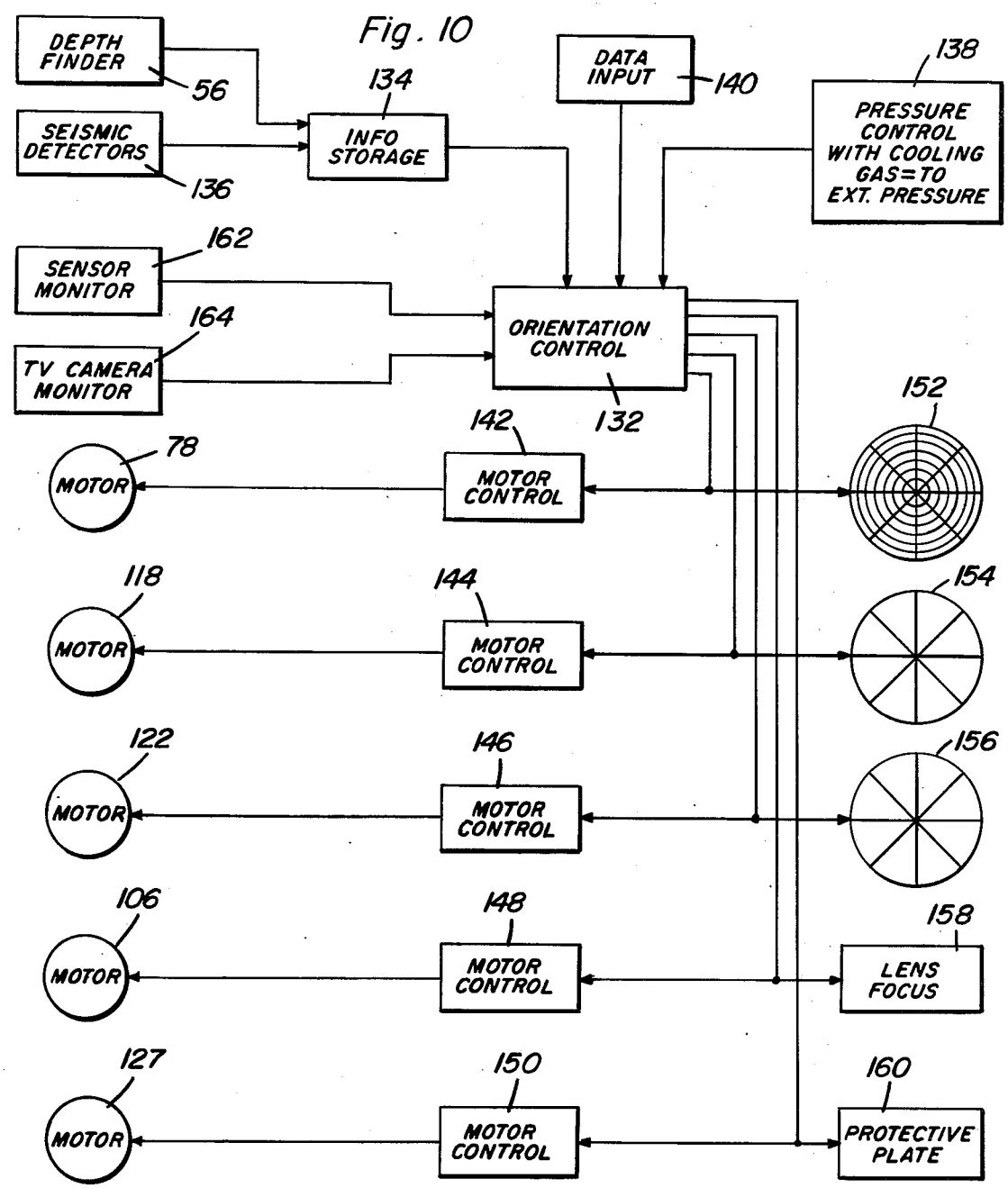
FIG. 10 is a schematic block diagram depicting the control system associated with the apparatus of the present invention.

FIG. 10 schematically illustrates the monitoring and recording system aforementioned. An orientation control component 132 receives information from storage 134 derived from seismic detectors 136 and depth finder 56, from a pressure control component 138 and from other sources. On command, the orientation control will effect operation of the aforementioned adjusting motors 78, 106, 118, 122 and 127 through motor control circuits 142, 144, 146, 148 and 150 based on the processed input information designed to obtain optimum recovery. Also, the signal inputs to the adjusting motors 78, 118 and 122 which determine the angular position of the drilling beam relative to the three perpendicular intersecting axes about which the beam is adjusted, are registered on visual indicators 152, 154 and 156. The adjustable condition of the focusing lens 102, and seal plate 126, may also be registered by the indicators 158 and 160.

Internal monitoring of the equipment within the bore hole may be provided for in the monitoring system depicted in FIG. 10 through use of a gravitational sensor 162 and a television monitoring camera 164 supplying inputs to the control component 132. The television monitor 164 could be located just below reflector assembly 128 in FIG. 2. An arrangement utilizing such internal monitoring components is shown in FIG. 6 in more detail.

Figure 6:
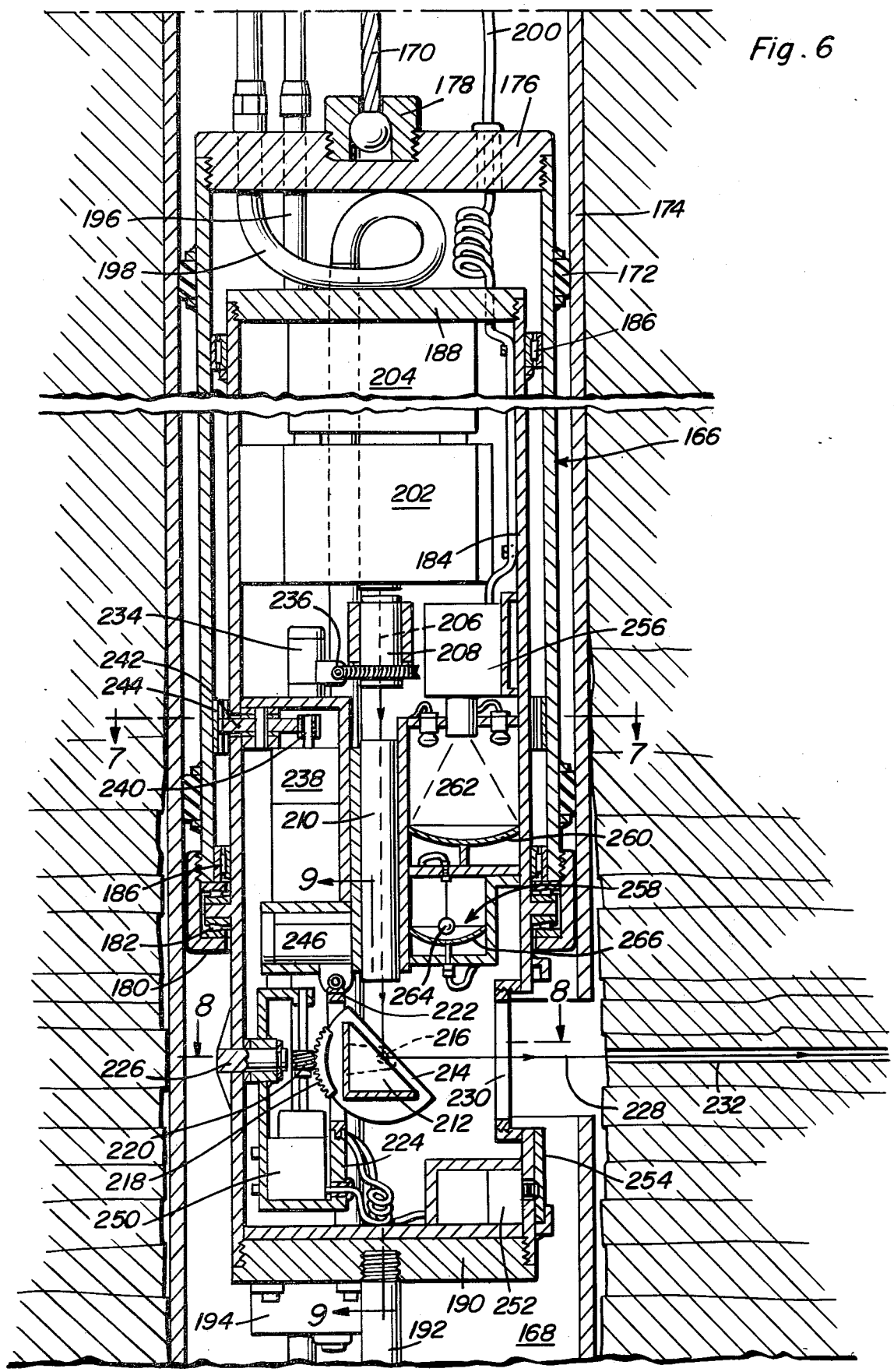
FIG. 6 is a side section view of another embodiment of apparatus corresponding to that shown in FIG. 2.

While the arrangement shown in FIG. 2 is operative only in optically straight bore holes of relatively shallow depth, FIG. 6 shows an arrangement that may also be utilized in bore holes that are not optically straight. Thus, in FIG. 6, a non-rotatable tubular housing 166 enclosing optical components and adjusting mechanism is suspended within bore hole 168 by a flexible cable 170 radially spaced by spacer seals 172 from a fixed casing 174 lining the bore hole. The upper end of the tubular housing 166 is closed by cover 176 to which the cable 170 is connected by anchor 178. A bearing retainer 180 is threadedly connected to the lower end of housing 166 for support of axial thrust bearings 182 rotationally supporting an inner rotatable housing 184. Spaced radial bearings 186 maintain the tubular housings 166 and 184 concentric. The upper end of housing 184 is closed by cover wall 188 while a bottom wall 190 closes the lower end projecting below the non-rotatable housing 166. A rod 192 connected to and extending downwardly from the bottom wall 190 protects a vacuum pump 194 through which a bore hole suction pressure is maintained. Suction conduit 196 connected to the vacuum pump extends through the housings to discharge bore hole fluids to an above surface location. An electric power cable 198 extends into the housing 166 from an above surface location to supply all of the energized components. Monitoring signals are conducted through cable 200 to above surface monitors from the housings.

Figure 7:
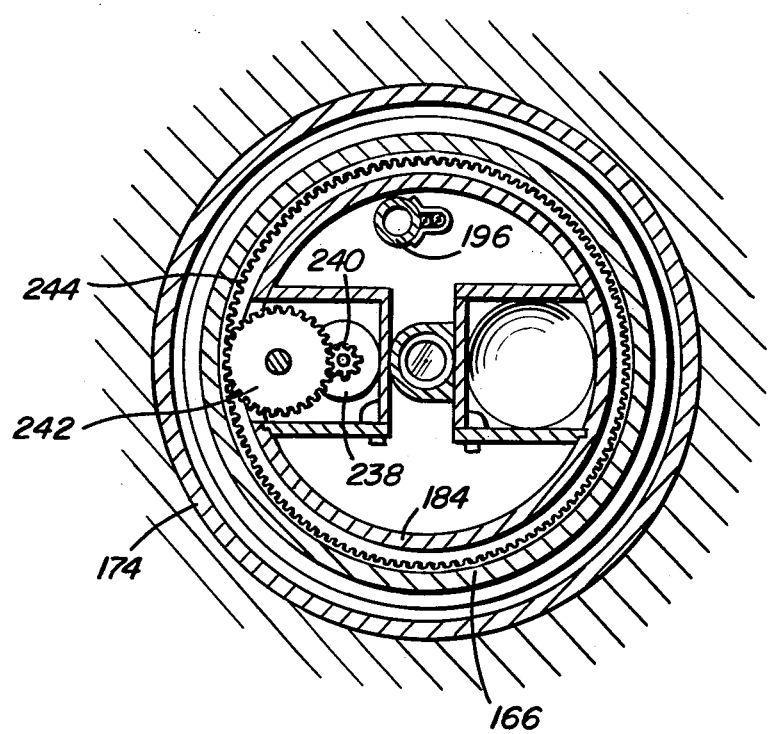
FIG. 7 is a transverse section view taken substantially through a plane indicated by section line 7—7 in FIG. 6.
Figure 8:
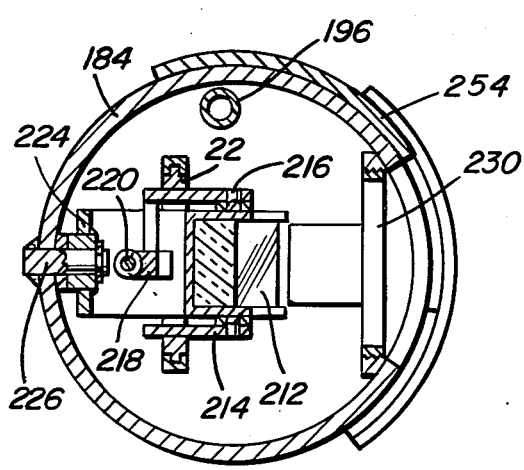
FIG. 8 is a transverse section view taken substantially through a plane indicated by section line 8—8 in FIG. 6.
Figure 9:
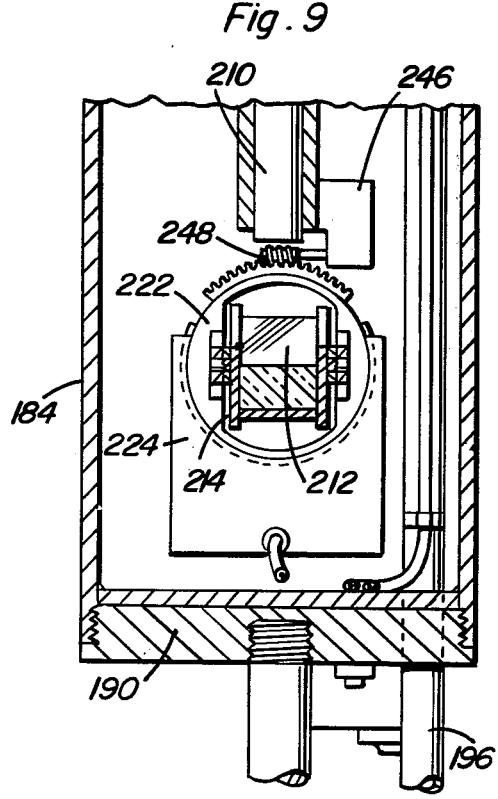
FIG. 9 is a partial section view taken substantially through a plane indicated by section line 9—9 in FIG. 6.

The outer housing 166 carries all of the components necessary for drilling so that they may be lowered by cable 170 to any desired depth without requiring vertical alignment with above surface components as in the case of FIG. 2. The inner housing 184 mounts a laser beam generator 202 and an internal cooling system generator 204 thereabove associated with the pressure control component 138 aforementioned. The laser beam 206 is projected from the laser generator downwardly along the rotational and longitudinal axis of the housing 184 established by the radial bearings 186. The beam 206 travels through axially aligned focusing lens 208 and collimating lens 210 to an adjustable reflector 212 pivoted between side plates 214 about an axis 216. The side plates are interconnected with a sector worm wheel 218 in mesh with worm gear 220 and are pivotally adjustable about an axis in perpendicular intersecting relation to axis 216 by means of ring 222 that is rotatably mounted by bracket 224. The latter axis extends through pivot 226 about which the bracket 224 is angularly adjustable relative to inner housing 184 as more clearly seen in FIG. 8. Thus, the reflector 212 is angularly adjustable about three perpendicular intersecting axes to control the orientation of drilling beam 228 reflected therefrom through opening 230 in the housing to form the bore 232 in the formation being drilled. A motor 234 fixed to the housing 184 is drivingly connected by worm gearing 236 to the focusing lens for adjustment thereof. A motor 238 fixed to the housing 184 drives a gear 240 in mesh with gear 242. The gear 242 projects through an arcuate slot in housing 184 as more clearly seen in FIG. 7 to mesh with internal gear 244 formed on the housing 184 to effect angular adjustment thereof about its axis. Motor 246 fixed to the housing 184 is drivingly connected through worm gearing 248 as more clearly seen in FIG. 9 to the ring 222 for angular adjustment of the bracket 224. The bracket 224 carries motor 250 to drive worm gear 220 for angularly adjusting the reflector 212 relative to the bracket. Finally, a motor 252 is drivingly connected to a movable seal plate 254 for opening or closing the opening 230 through which the drilling beam emerges. All of the foregoing adjusting motors are energized by power supplied through power cable 198 in response to control signals as aforementioned, including signal outputs from a television camera 256 and a gravitational sensor 258.

The television camera 256 monitors movement of a mercury droplet on a spherical surface 260 fixed within the inner housing 184, the surface 260 being illuminated by lamps 262. The sensor 258 includes a wire suspended weight 264 making electrical contact in predetermined directions with a spherical contact plate 266. Signals from the camera 256 and/or sensor 258 will accordingly reflect the orientation of the drilling laser beam for any adjusted position of the reflector 212.

Figure 11:
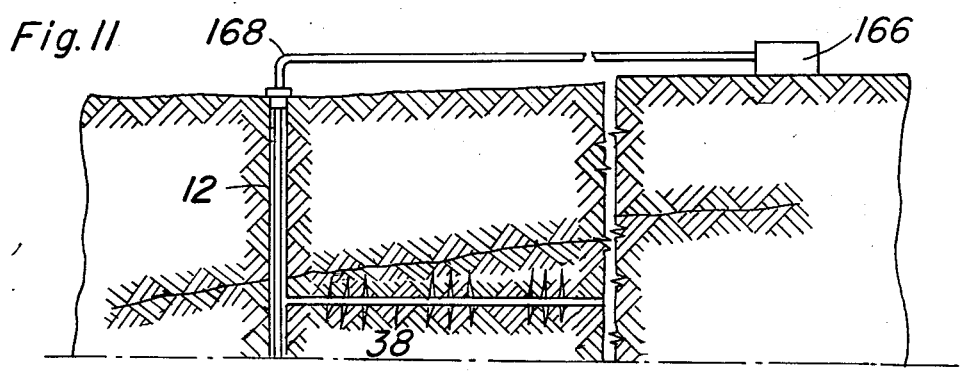
FIG. 11 is a partial section view through a formation, drilled by the apparatus shown in FIG. 1, into which pressurized fluids are injected.

It will be apparent from the foregoing description that apparatus constructed in accordance with the present invention may be installed in a field having vertical bore holes in different geometrical arrangements, to drill various horizontal bore patterns at one or more depths and in sequence in a three-dimensional recovery system. The horizontal bores extending from the vertical bore holes may be drilled on the basis of the natural fractionation pattern of the deposit to be recovered to form a three-dimensional matrix of horizontal bores matching the natural fractionation pattern. Once drilling is completed, the apparatus is removed and the subterranean bores 38 subjected to explosive or hydraulic fractionation as shown in FIG. 11. After fractionation, heat and pressure may be applied through the vertical input bore holes 12 by use of a source 166 of pressurized fluids such as a gas turbine or jet engine types of gas generators, for extracting oil from underground shale oil rock or in deposits of coal, sub-bituminous material or lignite. Suitable fluids such as air, oxygen, steam as well as catalytic agents may then be introduced through suitable injecting means 168 as diagramatically shown in FIG. 11 to extract gas by combustion and other gas evolving reactions. Solvents may also be introduced to extract deposits in liquid form.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for drilling in an underground formation extending from a vertical bore hole, including a laser beam generator projecting a laser beam through the vertical bore hole substantially parallel to a longitudinal axis, reflector means for reflecting the laser beam along a drilling path into the formation transversely of said longitudinal axis, an elongated tubular housing, means for angularly adjusting the housing about said longitudinal axis within the bore hole, and adjusting means connected to the reflector means for angular displacement thereof about perpendicular intersecting axes intersected by said longitudinal axis.

2. The combination of claim 1 including means for fixedly mounting the laser beam generator above the bore hole.

3. The combination of claim 1 wherein said housing is provided with an opening through which the laser beam is reflected along said drilling path, closure means mounted on the housing for movement between positions exposing the opening and closing of the opening, and selective remote control means for effecting displacement of the cover means between said positions.

4. The combination of claim 3 including means for fixedly mounting the laser beam generator above the bore hole.

5. The combination of claim 4 including internal sensing means for monitoring alignment of the housing within the bore hole and control means responsive to signals received from the sensing means for operating the adjusting means to maintain a predetermined drilling path.

6. The combination of claim 5 including vacuum pump means mounted on the housing for establishing a suction pressure within the bore hole below the housing.

7. The combination of claim 1 wherein said laser beam generator is mounted within the housing and cable means for suspending the housing within the bore hole at a selected depth.

8. The combination of claim 7 including internal sensing means for monitoring alignment of the housing within the bore hole and control means responsive to signals received from the sensing means for operating the adjusting means to maintain a predetermined drilling path.

9. The combination of claim 1 including above surface means for monitoring alignment of said drilling apparatus.

10. The combination of claim 9 including internal sensing means for monitoring alignment of the housing within the bore hole and control means responsive to signals received from the sensing means for operating the adjusting means to maintain a predetermined drilling path.

11. The combination of claim 9 including means for alternately directing the laser beam along an optical alignment path within the housing to the above-surface monitoring means for rendering the same operative.

12. The combination of claim 11 including means for fixedly mounting the laser beam generator above the bore hole.

13. A drilling assembly adapted to be inserted into a vertical bore hole formed within an underground formation, comprising an elongated tubular housing means for angularly adjusting the housing about a longitudinal axis thereof within the bore hole, a laser beam generator projecting a laser beam through the housing substantially parallel to said longitudinal axis, reflector means mounted within the housing for reflecting the laser beam along a drilling path externally of the housing into the formation, and adjusting means connected to the reflector means for angular displacement thereof about perpendicular intersecting axes intersected by said longitudinal axis of the housing, said housing being provided with a lateral opening through which the laser beam is reflected along said drilling path.

14. The combination of claim 13 including means for fixedly mounting the laser beam generator above the bore hole.

15. The combination of claim 13 wherein said laser beam generator is mounted within the housing and cable means for suspending the housing within the bore hole at a selected depth.

16. The combination of claim 13 wherein said drilling path extends into the formation to match a natural fractionation pattern.

17. A method of preparing subterranean deposits, including the steps of: drilling a vertical bore hole into an underground formation; projecting a laser beam through said vertical bore hole; reflecting said laser beam horizontally from said hole through the formation; angularly orientating the reflected laser beam along a matrix of bores; and injecting fluids into deposits through said matrix of bores.

18. A method of preparing subterranean deposits, including the steps of: drilling a vertical bore hole into an underground formation; projecting a laser beam through said vertical bore hole; reflecting said laser beam horizontally from said hole through the formation along a matrix of bores; and injecting fluids into the deposits through said matrix of bores, said underground formation having a natural fractionation pattern substantially matched by said matrix of bores, said fluids being injected into the formation through the matrix of bores for in situ fractionation of the deposits.

19. For use in preparing a subterranean formation to enhance recovery of deposits therefrom, drilling apparatus positioned within a vertical bore hole extending into said formation including a laser device, means for projecting a laser beam emitted from the laser device through the vertical bore hole, means for reflecting the laser beam from the bore hole through the formation to form a substantially horizontal bore therein, a source of fluids, and means for injecting said fluids into the deposits through said bore, the formation having a natural fractionation pattern, a plurality of said horizontal bores being drilled to substantially match said fractionation pattern, said fluids being injected through said bores to effect in situ fractionation of the deposits.

* * * * *